(12) United States Patent
Wang et al.

(10) Patent No.: US 11,453,409 B2
(45) Date of Patent: Sep. 27, 2022

(54) EXTENDED MODEL REFERENCE ADAPTIVE CONTROL ALGORITHM FOR THE VEHICLE ACTUATION TIME-LATENCY

(71) Applicant: Baidu USA LLC, Sunnyvale, CA (US)

(72) Inventors: Yu Wang, Sunnyvale, CA (US); Qi Luo, Sunnyvale, CA (US); Shu Jiang, Sunnyvale, CA (US); Jinghao Miao, Sunnyvale, CA (US); Jiangtao Hu, Sunnyvale, CA (US); Jingao Wang, Sunnyvale, CA (US); Jinyun Zhou, Sunnyvale, CA (US); Jiaxuan Xu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 194 days.

(21) Appl. No.: 16/854,718

(22) Filed: Apr. 21, 2020

(65) Prior Publication Data
US 2021/0323564 A1     Oct. 21, 2021

(51) Int. Cl.
| | |
|---|---|
| *B60W 60/00* | (2020.01) |
| *B60W 50/04* | (2006.01) |
| *B60W 10/18* | (2012.01) |
| *B60W 50/06* | (2006.01) |
| *G05D 1/02* | (2020.01) |
| *B60W 10/20* | (2006.01) |

(52) U.S. Cl.
CPC .......... *B60W 50/045* (2013.01); *B60W 10/18* (2013.01); *B60W 10/20* (2013.01); *B60W 50/06* (2013.01); *B60W 60/001* (2020.02); *G05D 1/0223* (2013.01); *G05D 2201/0212* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2009/0048748 A1* | 2/2009 | Zhao | B60W 50/0097 701/93 |
| 2016/0107682 A1* | 4/2016 | Tan | G05D 1/0212 701/41 |
| 2018/0141540 A1* | 5/2018 | Kumazaki | F16H 63/50 |

(Continued)

*Primary Examiner* — James M Mcpherson
(74) *Attorney, Agent, or Firm* — Womble Bond Dickinson (US) LLP

(57) ABSTRACT

Systems and methods are disclosed for reducing second order dynamics delays in a control subsystem (e.g. throttle, braking, or steering) in an autonomous driving vehicle (ADV) and increasing control system bandwidth by accounting for time-latency in a control subsystem actuation system. A control input is received from an ADV's autonomous driving system. The control input is translated into a control command of the control subsystem of the ADV. A reference actuation output and a predicted actuation output are generated corresponding to a by-wire ("real") actuation action for the control subsystem. A control error is determined between the reference actuation action and the by-wire actuation action. A predicted control error is determined between the predicted actuation action and the between the by-wire actuation action. Adaptive gains are determined and applied to the by-wire actuation action to generate a second by-wire actuation action.

22 Claims, 12 Drawing Sheets

(56) References Cited

U.S. PATENT DOCUMENTS

| | | | |
|---|---|---|---|
| 2019/0250607 A1* | 8/2019 | Sadakiyo | B60W 30/18 |
| 2019/0258251 A1* | 8/2019 | Ditty | G06V 20/58 |
| 2020/0041994 A1* | 2/2020 | Alalao | H04W 4/18 |
| 2020/0114968 A1* | 4/2020 | Xu | B60D 1/245 |
| 2020/0363816 A1* | 11/2020 | Zuo | B60W 50/0098 |
| 2021/0163021 A1* | 6/2021 | Frazzoli | B60W 50/0205 |
| 2021/0208596 A1* | 7/2021 | Tong | G05D 1/0221 |

\* cited by examiner

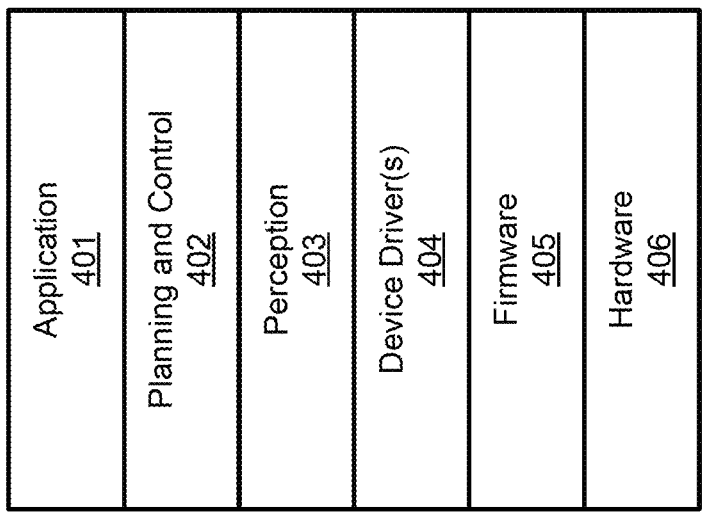

EXTENDED MODEL REFERENCE ADAPTIVE CONTROL ALGORITHM FOR THE VEHICLE ACTUATION TIME-LATENCY

TECHNICAL FIELD

Embodiments of the present disclosure relate generally to operating autonomous vehicles. More particularly, embodiments of the disclosure relate to an efficient, real-time process for addressing time-latency and actuation dynamic delay in autonomous vehicle control subsystems, to improve autonomous vehicle control.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed (first order dynamics), without considering the second order dynamics of control subsystems, such as brakes, throttle, and steering.

Due to the usage of electronic determination and actuation of control systems such as brakes, throttle, and steering ("drive-by-wire"), there exists some latency time and system dynamic delays in the vehicle actuation system. Time-latency can occur due to delay in detecting that a control command is needed to stay on the planned trajectory. Time-latency can be attributable to data collection and processing time needed to identify objects surrounding the vehicle and attributable to computing of a control command needed to stay on the planned trajectory. Time-latency can be on the order of 50-100 milliseconds (ms). Actuation dynamic delay can occur in a control subsystem when a control command is received by a control subsystem, such as brakes, throttle, or steering, and the control subsystem must actuate physical components to execute the control command. Actuation dynamic delay can result in undesired throttling/braking/steering control responses, especially during rapid acceleration or sharp turning driving scenarios. For example, in a typical side-pass driving scenario, when the autonomous vehicle quickly changes to another lane from a current lane, the steering action usually presents some dynamic lag compared with the desired steering angle that is based on the steering command from the control module. As a result, the overall lane changing process can become unsmooth and be uncomfortable for passengers in the vehicle.

Actuation dynamic delay can be attributable to physical actuators or elements, such as motors, drive belts, brake pads and cylinders, or combustion, needing time to implement the physical actions that implement the control command. Actuation dynamic delay of a received command can manifest as a rise time of the actuation, an overshoot amount, and a settling time for a measured state of the physical actuator to match the received control command. Actuation dynamic delay can be on the order of several hundreds of milliseconds, up to 500 ms; substantially longer than latency.

Control subsystems such as brakes, steering, and throttle, are often provided by third-party suppliers, different from the party that develops a control system for the autonomous vehicle. Thus, developers of autonomous vehicle control subsystems must consider the operational characteristics of the control subsystems as a "black box." Accordingly, previous industrial efforts in the autonomous vehicle field attempt to design a simple proportional-integral-derivative (PID) controller on steering actuation to reduce the negative effects of the actuation dynamics. However, due to the over-simplified structure of PID-based controller, the PID controller can only increase the steering dynamic response to some extent, but cannot fully address the actuation time-latency and dynamic delay problem.

Time-latency magnitude can be much larger than dynamic delays and can present more serious control challenges which cannot be easily compensated for by a linear dynamic model, because the time-latency is a kind of nonlinear system from the viewpoint of the frequency-domain. More seriously, the existence of the time-latency not only postpones the system response, but also can easily make the closed-loop control system lose stability.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating architecture of an autonomous driving system according to one embodiment.

DETAILED DESCRIPTION

Figure 1:
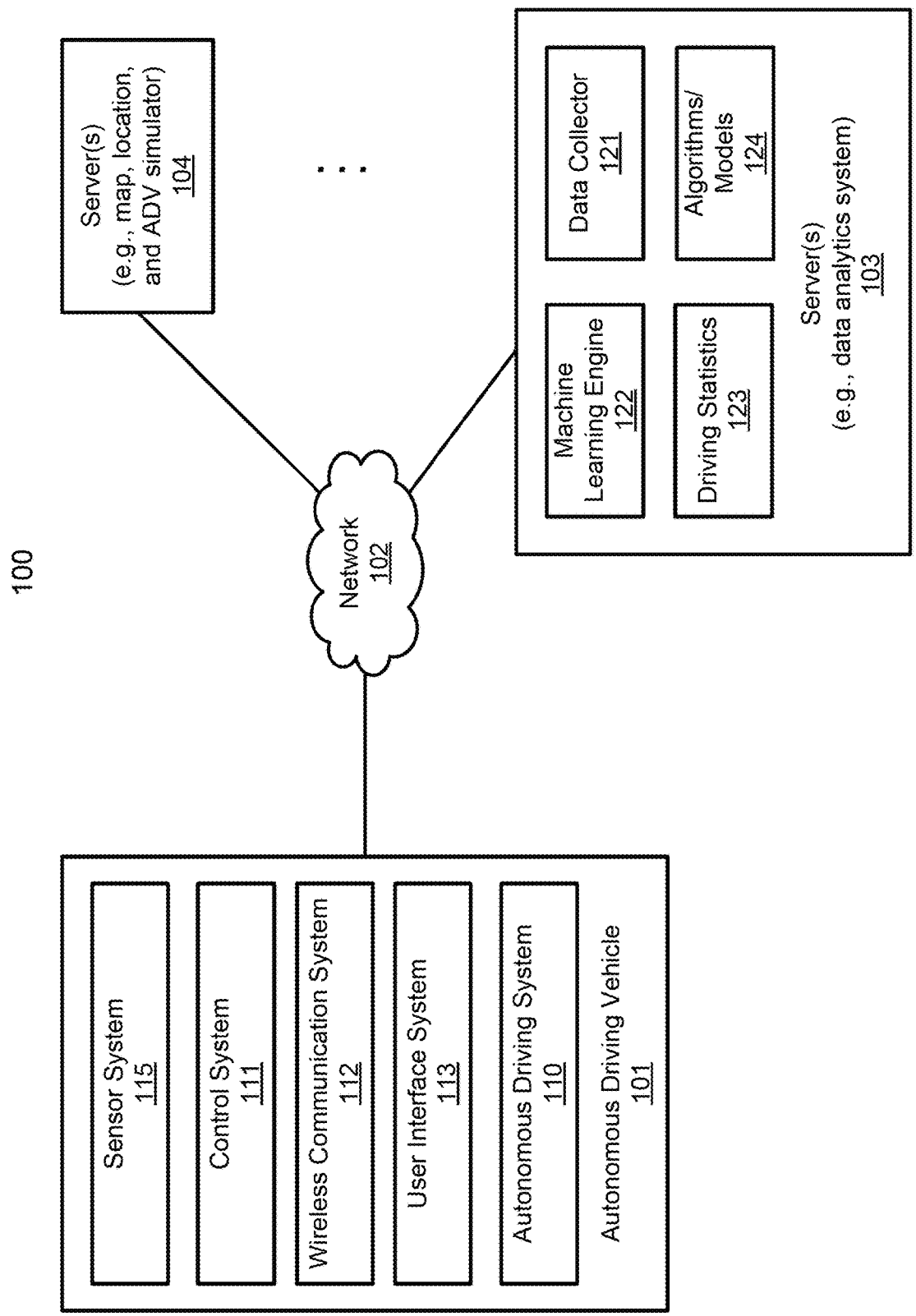
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In an embodiment, a method of improving performance of a control subsystem of an autonomous driving vehicle (ADV) control system includes receiving, by a feedback controller and a reference system, an actuation command of an actuation system of the control subsystem of the ADV. The control subsystem can be, e.g., a throttle control subsystem, a braking control subsystem, or a steering control subsystem. A predicted actuation action is generated corresponding to the actuation command. A reference actuation output is generated corresponding to the actuation command. In an embodiment, the reference actuation output (581) is based at least in part on second order attributes of a dynamic model of the control subsystem. The second order attributes of the control subsystem can include one or more of: time-latency in initiating a control action of the control subsystem, a rise time, an overshoot amount, or a settling time of an actuator of the control subsystem. A control error is determined between a first actuation command output of an actuator of the control subsystem and the reference actuation output. A predicted control error is determined between the first action command output and the predicted actuation output. In an embodiment, generating the predicted actuation output further includes generating time-latency information and the predicted actuation output is based at least in part on the generated time-latency information. An adaptive gain is then generated that is based upon the control error and the predicted control error, and a second actuation command is output to actuate the control subsystem. The second actuation command is based upon the first actuation command output and the adaptive gain. In an embodiment, the method can further include generating a second predicted actuation output. Generating the second predicted actuation output can include generating a temporary actuation output by the feedback controller applying the adaptive gains to the first actuation command output; generating time-latency information for the temporary actuation output; and generating the second predicted actuation output based at least in part upon the temporary actuation command and the time-latency information. In an embodiment, generating a second reference actuation output can include applying a time-delay compensation function to the first actuation command output and the adaptive gains to generate a second temporary actuation output, and the second reference actuation output is based at least in part upon the second temporary actuation output. The method can further include determining a second predicted control error between the second actuation command output and the second predicted actuation output; determining a second control error between the second actuation command output and the second predicted actuation output; and generating second adaptive gains based upon the second control error and the second predicted control error.

In an embodiment, any/all of the above method functionality can be implemented by a processing system, comprising one or more hardware processors coupled to a memory programmed with executable instructions that, when executed by the processing system, cause a computing system to implement the claimed functionality. In an embodiment, the memory can be a non-transitory computer-readable medium or other type of memory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, simulated autonomous vehicle driving servers, or location servers, etc. An autonomous vehicle driving simulator server 104 can include data logging of driving records substantially identical to the data logging of a real autonomous driving vehicle. The driving simulator can be used to test proposed updates to autonomous vehicle control systems. The driving simulator can upload its driving records for processing by, e.g., server 103 algorithms 124 to generate a set of standardized metrics 124 that characterize performance of the autonomous vehicle control system.

An autonomous vehicle 101 refers to a vehicle that can be configured to be driven in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. As described herein, in some embodiments, an autonomous vehicle is simulated in an autonomous driving simulator of server 104. Characteristics and identifiers, such as an autonomous vehicle type (e.g. Lexus®, Honda®, SmartCar®, Kia®, et al.) and an autonomous vehicle controller type (e.g. model predictive control, or linear quadratic regulator) can be used to identify simulated autonomous vehicles within an autonomous driving simulation system and driving records generated by a simulated autonomous vehicle driving session.

In one embodiment, autonomous vehicle 101 includes, but is not limited to, autonomous driving system (ADS) 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or ADS system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
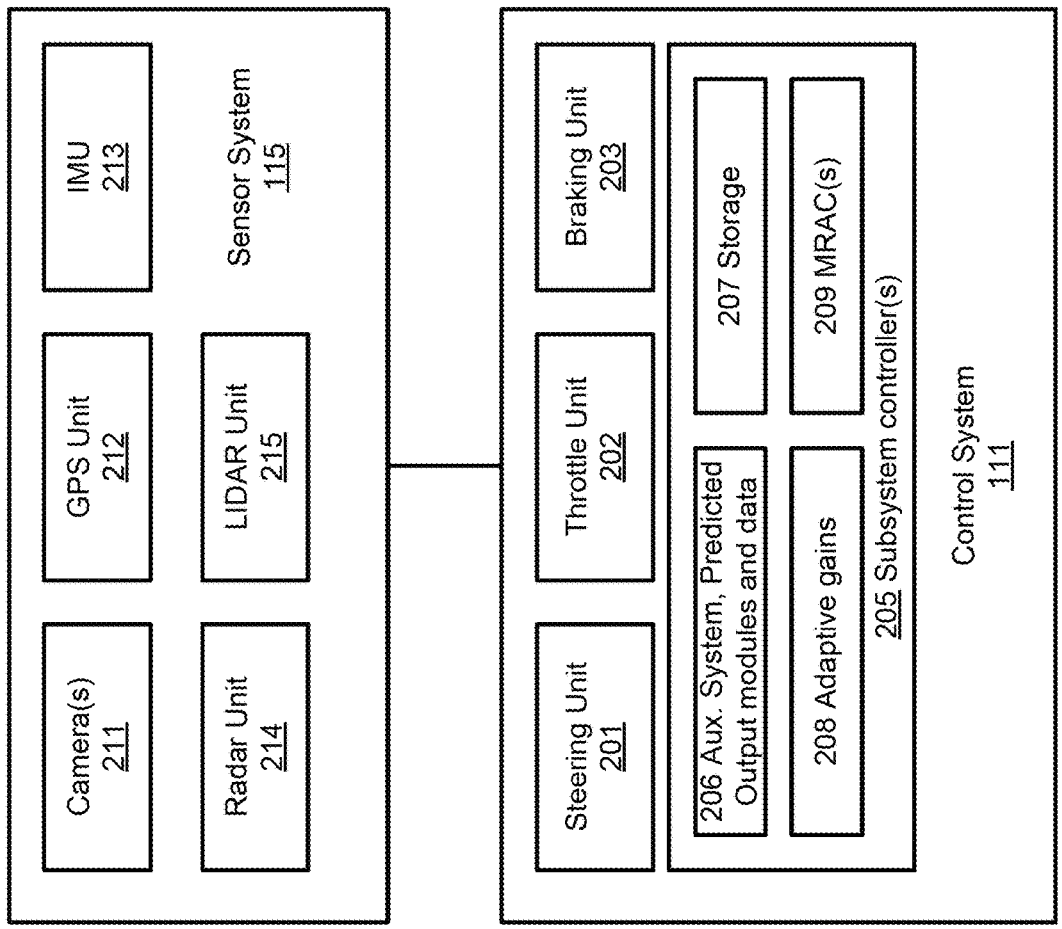
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle.

Control system 111 may further comprise subsystem controllers 205. Subsystem controllers 205 can include a controller for the steering unit 201, a controller for the throttle unit 202, and a controller for the braking unit 203. Each subsystem controller 205 receives one or more control commands from the ADV control system 111. As described with reference to FIG. 3C, below, the ADV control system 111 receives a trajectory path for the ADV to follow to navigate a portion of an ADV route. The control system 111 can determine an amount of steering, braking, and/or throttling that is needed to navigate the ADV along the trajectory path. Control system 111 then issues one or more commands to one or more control subsystems (steering unit 201, throttle unit 202, braking unit 203). A steering command can be in the form of a target steering angle, e.g. to the left or right of straight ahead, expressed in degrees or radians. A throttle command from the control system 111 to the throttle unit 202 can be e.g. a target speed, acceleration, or percentage of full throttle. A braking command from the control system 111 to the braking unit 203 can be, e.g. a target speed, a deceleration rate, or a percentage of full braking. Each control command from control system 111 to a control subsystem (steering unit 102, throttle 202, or braking 203) can be translated into a physical action on the control subsystem by a controller within the subsystem.

The physical actuation by a control subsystem of a command received from the control system 111 is not immediate. A time-latency in physical actuation represents a difference between a time issuing of a command from the controller 111 and the time that the subsystem controller outputs a command to begin the physic actuation. After execution of the command begins by the subsystem controller, dynamic delays exist in executing the command to attain the physical target actuation commanded by the controller 111. The systems and methods described herein compensate for the time-latency and dynamic delays in physical actuation of the subsystem to improve the bandwidth of the control system 111. An example command from an ADV controller to a subsystem controller, and the resulting time-latency and actuation dynamics of the subsystem are described below with reference to FIG. 3C.

Subsystem controller(s) 205 can include storage for reference actuation outputs 206, storage 207 for e.g. parameters of the dynamic models, storage 208 for adaptive gains, and a one or more model reference adaptive controllers (MRAC) 209. In an embodiment, reference actuation outputs and/or predicted actuation outputs can be generated from a model or one or more algorithms and data. Reference ("auxiliary system") actuation outputs, predicted actuation outputs, and other data 206, adaptive gains 208, and MRACs 209 are described more fully, below, with reference to FIGS. 5A-5C.

Subsystem controllers 205 can be integrated with ADV controller 111 or as stand-alone subsystem controllers. In practice, subsystem controllers are often third-party controllers such that the ADV control system communicates with the subsystem actuators controller via a programming interface, and the specifics of how a command is executed and actuated by the control subsystem are a "black box" to the ADV controller designer. Compensating for the time-latency and actuation dynamic delays of a subsystem, as described herein, enable an ADV to adaptively account for time-latency and actuation dynamic delays of a subsystem without needing to know the cause or reason for the time-latency and actuation dynamic delays. Control subsystem time-latency and actuation dynamic delay are particularly important in driving scenarios that require rapid braking, accelerating, or steering. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of ADS 110.

While autonomous vehicle 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Autonomous driving vehicle (ADV) 101 can generate and log driving records that capture data from the subsystems, e.g. sensor system 115, control system 111, and ADS 110. The driving records can be uploaded to a server, e.g. server 103, for storage by data collector 121. A cross-platform control profiling system, stored in e.g. server 103 algorithms and models 124, can analyze driving records from a large plurality of ADVs and simulated ADVs to generate driving Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a cross-platform control profiling system that generates a set of standardized statistics, or metrics, 123 characterizing performance of an autonomous driving control system of the ADV using ADV driving data and simulated ADV driving data ("cross-platform" meaning both real and simulated ADV driving records). Raw driving data records are uploaded from an ADV at a specified time, or manually, to date collector 121. Simulated ADV driving data is also uploaded to data collector 121. Algorithms 124 are used to generate the set of set of standardized metrics characterizing the performance of the ADV control system. The metrics are stored in driving statistics 123, and distributed to subscribing users, such as design engineers.

Figure 3A:
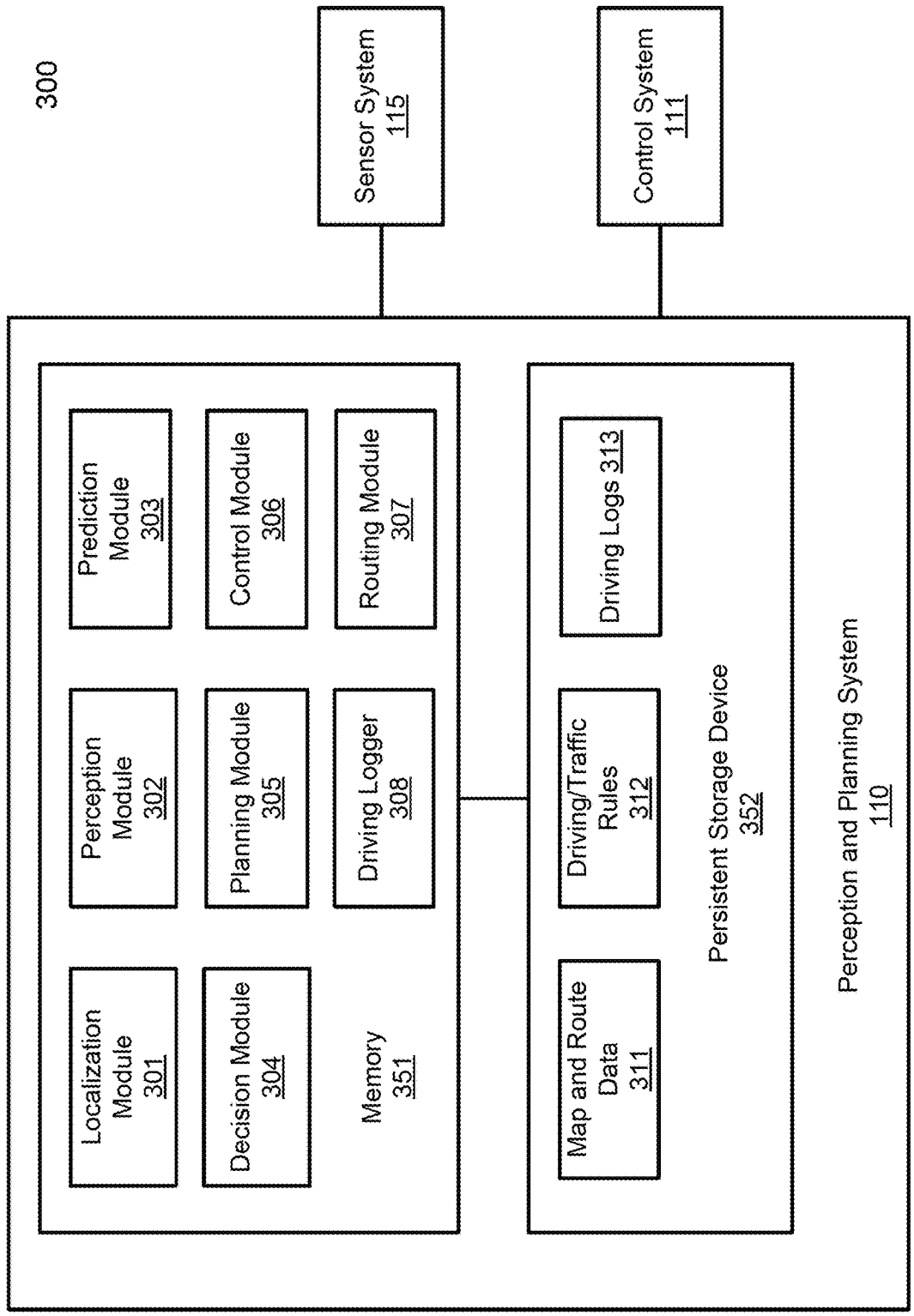
FIGS. 3A and 3B are block diagrams illustrating an example of an autonomous driving system used with an autonomous vehicle according to one embodiment.
Figure 3B:
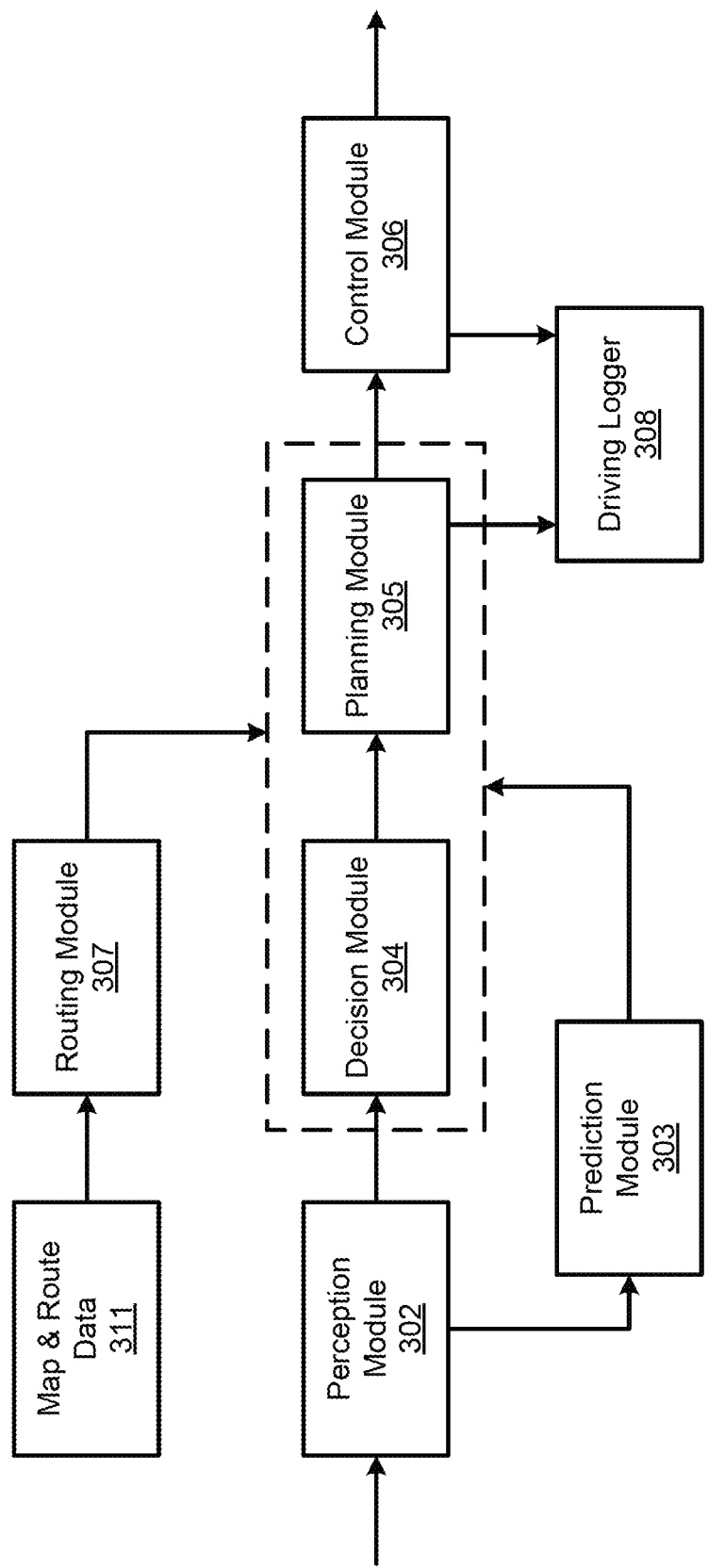

FIGS. 3A and 3B are block diagrams illustrating an example of an autonomous driving system used with an autonomous vehicle according to one embodiment. System 300 may be implemented as a part of autonomous vehicle 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and driving logger 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route data 311, to obtain the trip related data. For example, localization module 301 may obtain location and route information from a location server and a map and POI (MPOI) server. A location server provides location services and an MPOI server provides map services and the POIs of certain locations, which may be cached as part of map and route data 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route data 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map data 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Driving logger 308 records driving records from at least three data channels of the ADV control system: the control channel, the chassis channel, and the localization channel. The control channel produces information about control commands to control systems of the ADV, such as braking, throttle, and steering. The chassis channel produces information from various sensors, such as accelerometers, and readings of actual positions or actuations of the braking, throttle, and steering systems. The localization channel produces information regarding the actual location and heading of the ADV with reference to a standard reference such as a high-definition (HD) map or a global positioning satellite (GPS) system. Data records can be recorded at approximately 100 frames per second (fps), or at about 10 milliseconds (ms) per frame. Each driving record has a timestamp. A timestamp can be an absolute timestamp in the form of hh:mm:ss:ms (hours, minutes, seconds, milliseconds) relative to a start time, such as the start of a driving route. In embodiment, the timestamp can be a frame number, relative to a start time such as the start of the driving route. In an embodiment, each driving record can additional have a date stamp in addition to the time stamp. Data logger 308 can log driving records for simulated ADV driving sessions as well as real-world ADV driving sessions.

Data logger 308 can write the driving records to a non-volatile storage such as driving logs storage 313. Driving logs 313 can be uploaded to a server system, e.g. server(s) 103-104, to generate a set of standardized performance metrics that grade the performance of a controller of the ADV. The controller of the ADV can be updated using the standardized set of metrics, and the updated controller of the ADV can be stored in non-volatile storage 314.

As shown on FIG. 3B, data logger 308 can also receive driving records from the planning module. The planning module driving records can be used to compare planned driving conditions vs. actual (or simulated) driving conditions, to grade the performance of the ADV controller.

Figure 3C:
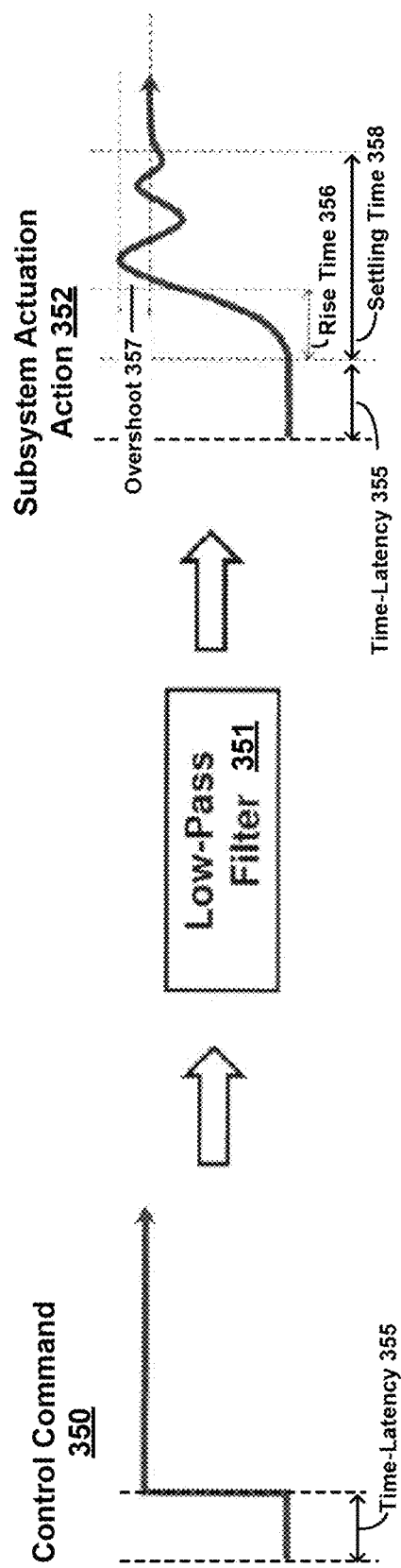
FIG. 3C illustrates an example ADV control command and an autonomous vehicle control subsystem actuation action response to the control command, according to some an embodiment.

FIG. 3C illustrates an example ADV control command and an autonomous vehicle control subsystem actuation action response to the control command, according to an embodiment. A hypothetical example control command 350 is shown as a step function. In practice, control inputs typically are not step functions. However, the control input well-illustrates the concepts to be described herein. Control command 350 has a time-latency 355. The time-latency is a time between a control input given by ADV control system 111, given to an ADV control subsystem (e.g. throttle, steering, brakes), and the beginning of actuation of the control subsystem in response to the control input.

The control command 350 can be passed through a low-pass filter 351 before being passed to the subsystem actuation 352. ADV's are "drive-by-wire," meaning that the control subsystem actuation is via transmission of a control command. In practice, control subsystem actuators are often provided by third parties, different from the designers of the ADV or the ADV controller. Thus, the designer of the ADV or ADV controller is aware that there are actuation delays, such as rise time 356, overshoot 357, and rise time 356, and time-latency after an actuation command is received and before actuation begins, but the designer of the ADV or ADV controller does not know the exact sources of the actuation delays. To the ADV designer or ADV controller designer, the control subsystem actuator is merely a "black box," which has actuation delays in relation to input control commands. Systems and methods described herein can account for the actuation delays and time-latency using a reference actuation output, a predicted actuation output, a by-wire actuation output, adaptive gains, time-delay compensation, and time-latency compensation, and a closed loop subsystem controller.

Figure 3D:
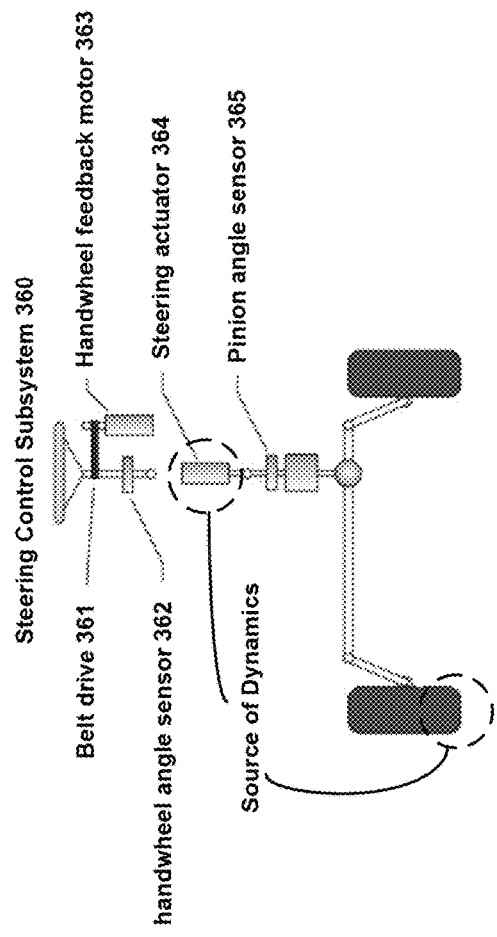
FIG. 3D illustrates a steering control subsystem as used in an autonomous vehicle, and sources of dynamics, according to an embodiment.

FIG. 3D illustrates a steering control subsystem as used in an autonomous vehicle, and sources of dynamics, according to an embodiment.

Steering control subsystem 360 is an example control subsystem of ADV 101. Steering subsystems in ADVs are typically "drive by wire" systems that receive a control command, e.g. control command 350, and execute the control command through physical and electronic means. Steering control subsystem 360 can include a belt drive 361, a hand wheel feedback motor 363, a hand wheel angle sensor 362, a steering actuator 364, a pinion angle sensor, and tires. Steering actuator 364, e.g., and tires, may introduce sources of actuation dynamic delay.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
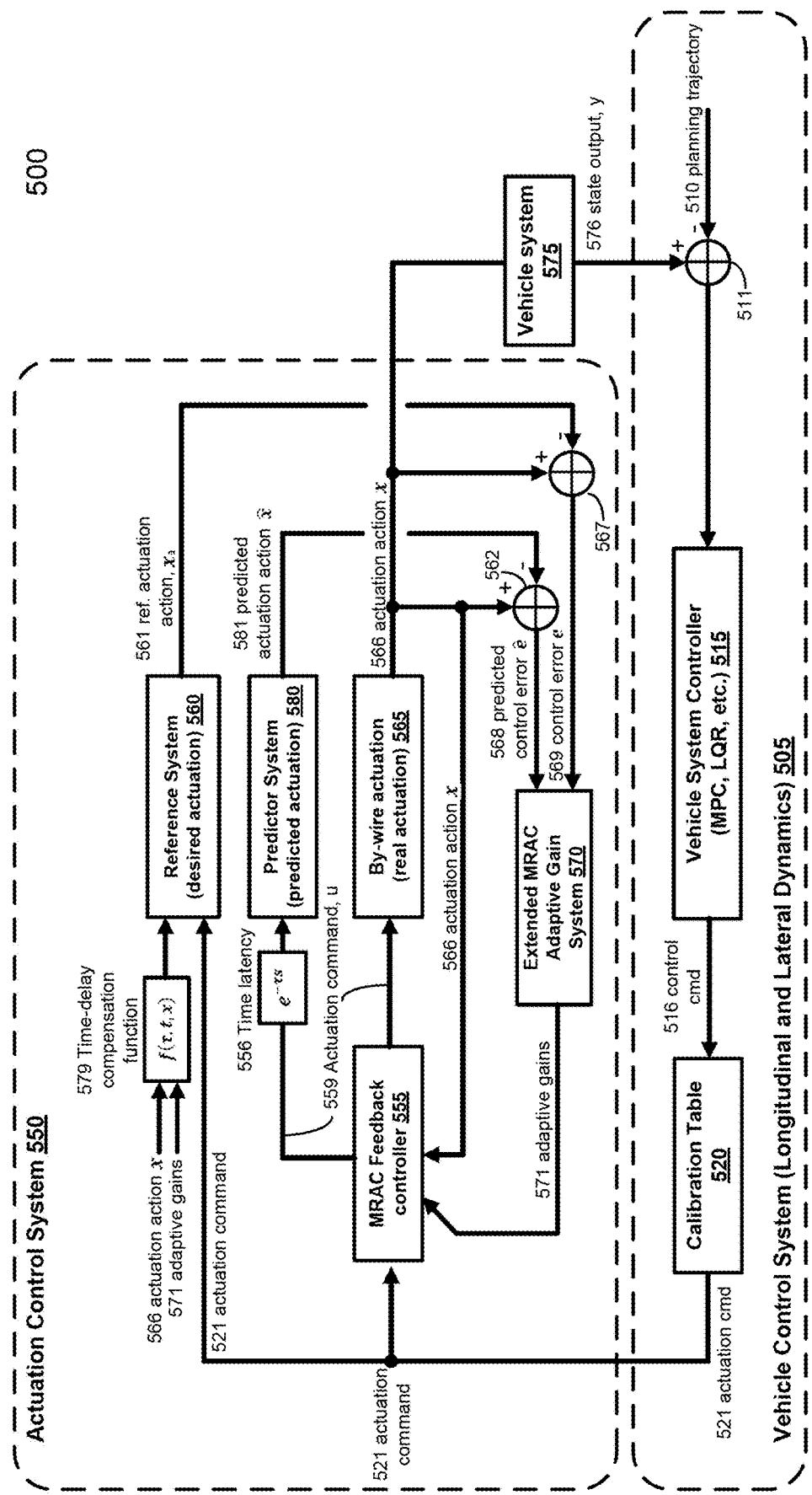
FIG. 5A is a block diagram 500 illustrating a data flow and a system that incorporates an extended model reference adaptive controller (MRAC) that improves actuation of one or more control subsystems of an autonomous driving vehicle (ADV), according to one embodiment.

FIG. 5A is a block diagrams illustrating a data flow and a system 500 that incorporates an extended model reference adaptive controller (MRAC) that includes a predictor system, and that improves control bandwidth of actuation of one or more control subsystems of an autonomous driving vehicle (ADV), according to one embodiment. Control subsystems can include braking, throttling, and steering systems of the ADV. When actuating a control subsystem using "drive-by-wire," there are second order dynamic delays and a time-latency of the control subsystem. Second order dynamics delays can include rise time, overshoot, and settling time of the measured state of actuation of the control subsystem, relative to the input actuation command. Actuation system 550 can reduce the second order actuation dynamic delays and time-latency to produce a smoother actuation control of a control subsystem using model reference 560, predictor system 580, model reference adaptive control (MRAC) feedback controller 555, and an extended MRAC adaptive gain system 570.

The auxiliary (reference) system 560 uses a time-delay compensation function 579 to reflect the "time-delay" effect in the real-world by-wire actuation system 565. Then, a delayed "desired" actuation output 561 is created by the reference system 560 to compare with the "imperfect" by-wire actuation system 565 actuation output 566, which contains both dynamic delay and time-latency in the vehicle actuation system 505. The control error 569 between the reference actuation action 561 and the by-wire actuation action 566 between them is the control error 569 that will be used in the adaptive gain process 570.

The predictor system 580 uses a "loop-shaping" mathematic model to "predict" the actuation system response in the near future time-horizon, and then, creates a "future" predicted actuation action 581 that contains a time-latency effect 556 to compare with the by-wire actuation action 566 of the vehicle control system 505. The predicted control error 568 between the predicted actuation action 581 and the by-wire actuation action 566 will also be used by the adaptive gain process 570 to determined adaptive gains 571.

The MRAC feedback controller 555 generates a "realizable" actuation action 559 control by feeding back the inputs/states/etc. using the (dynamically-tuned) adaptive gains 571.

Extended-MRAC adaptive gain system 570 performs online-adjustment of the adaptive gains 571 to ensure the convergence and stability of the inner closed-loop system of the actuation control system 550. The MRAC is extended to cover two aspects of dynamic components: the control error 569 between the "reference" system 560 and the "actual" (by-wire) system 565, and the predicted control error 568 between the "predictor" system 580 and the "actual" (by-wire) system 565.

The system 500 includes a vehicle system 505 controller and an actuation system 550. Actuation system 550 can include functionality for all control subsystems (throttle, braking, steering). In an embodiment, one or more control subsystems each have a respective actuation system 550. Vehicle system 505 can include a vehicle system controller 515 and a calibration table 520. Vehicle system 505 can be considered an "outer loop" with respect to actuation system 550 being an "inner loop" which can iterate as fast, or faster, than the vehicle systems 505 "outer loop." The outer loop addresses vehicle lateral dynamics. The inner loop addresses the vehicle actuation dynamics, e.g. steering, braking, or throttle actuation dynamics.

In operation, vehicle system 505 receives a planning trajectory 510, from an ADS, e.g. ADS 110, of the ADV. A summing circuit 511 receives the planning and trajectory 510 signal and also receives a state output, y, 576 of the vehicle system 575. State output 576 represents a current measured state of actuation of a control subsystem of vehicle system (e.g. chassis) 575. For example, planning and trajectory 510 may specify that a steering subsystem is commanded to be actuated to 8° left of center, and state output 576 reports that the current state of the steering subsystem is 5° left of center. Summing circuit 511 can report the difference as an additional 3° left of center, to vehicle system controller 515.

Vehicle system controller 515 can be any type of ADV vehicle controller such as model predictive controller (MPC) or a linear quadratic regulator (LQR). Vehicle system controller 515 outputs a control command 516 (e.g. a steering command) to calibration table 520. Calibration table 520 generates a subsystem control actuation command 521, e.g. a command to actuate the steering control subsystem to the planning trajectory 510 input of 8° with a steering input of an additional 3° left of center command (desired input 521) to achieve the 8° left of center indicated in the planning and trajectory signal 510. The desired input action, r, 521 is input to both the MRAC feedback controller 555 and the reference (desired actuation) system 560.

Figure 5B:
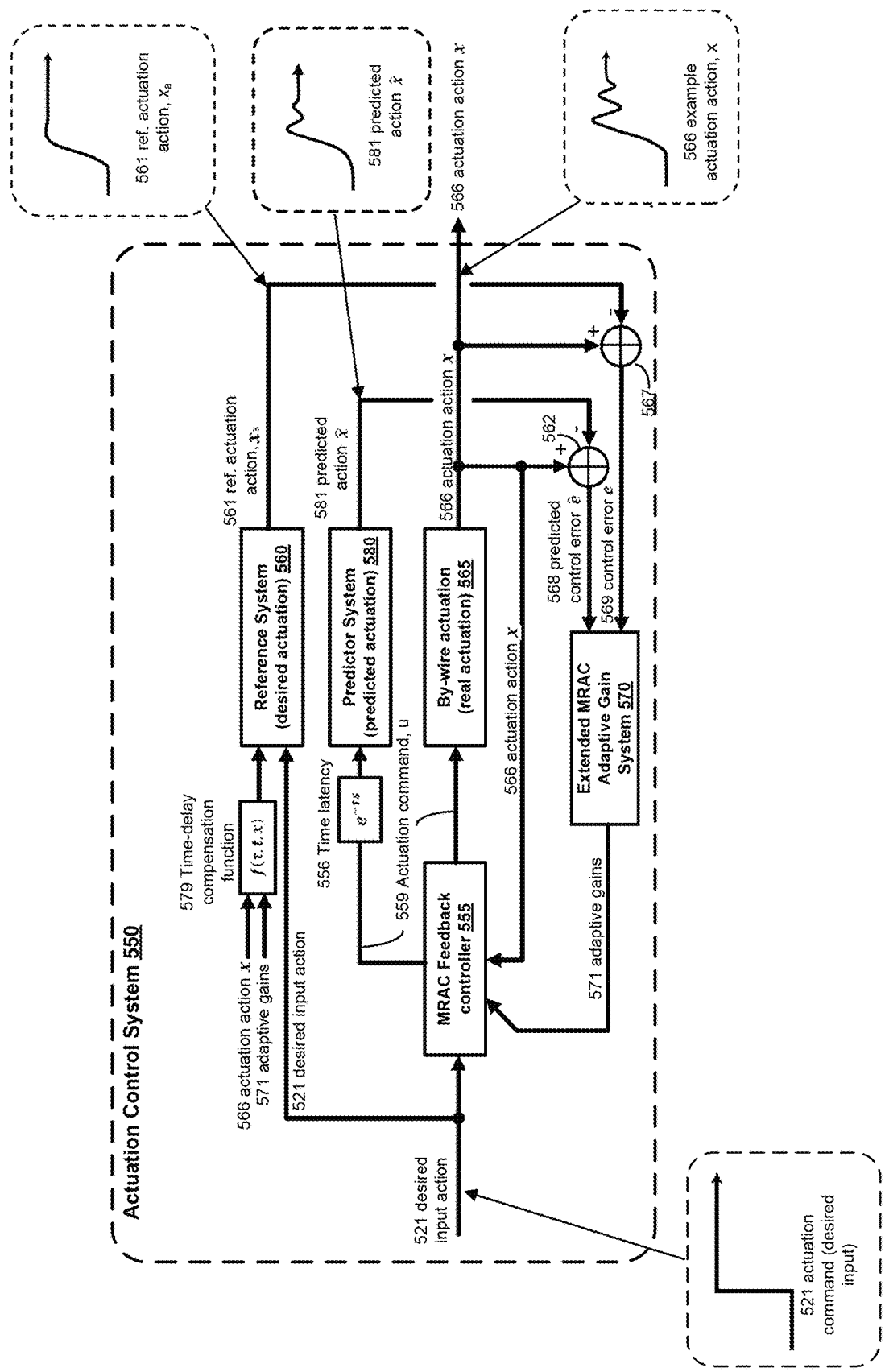
FIG. 5B is a block diagram illustrating a data flow of the model reference adaptive controller, according to one embodiment.

Referring now to FIG. 5B, an example desired input action 521 is shown as a step function input to the actuation system 550. In practice, input to an actuation system of a control subsystem is rarely a step function. However, the step function serves to illustrate the second order actuation dynamics of actuation system 550. Second order actuation dynamics are also described above, with reference to FIG. 3C. The desired input action 521 is passed to the MRAC feedback controller 555 and a reference system 560, at a time to.

Reference system 560 receives the desired input action 521 and creates a "desired" or "reference" actuation action 561 to compare with the "imperfect" by-wire actuation system 565 actuation action 566 of vehicle system 505. Model reference system 560 outputs the reference actuation action 561 to comparator (or, "summing circuit") 567 for comparison with by-wire actuation action 566, described below. A control error 569 is determined as the difference between the model reference actuation action 561 and the by-wire actuation action 566. Reference system 560 can look up a reference actuation action 561 that corresponds to the received desired input 521. The reference actuation action 561 can be retrieved from reference actuation outputs 206 storage of subsystem controller(s) 205 as shown with reference to FIG. 2, above. Second order dynamics delays and time-latency can be identified and characterized in a control subsystem as described in Applicant's related U.S. patent application Ser. No. 16/790,036 filed on Feb. 13, 2020, to Yu WANG et al., entitled, "Autonomous Vehicle Actuation Dynamics and Latency Identification." Reference system 560 can be a machine generated, or a manually generated, actuation curve that takes into account the second order dynamics delays of the control subsystem. For example, given the example desired input 521, reference system 560 can look up or generate example desired reference action, $x_a$ 561. Desired reference actuation action 561 is received by summation circuit 567. The reference actuation action 561 is an ideal or desired output to achieve that may, or may not, be physically achievable by the by-wire actuation system 565, but the reference system 560 does take into account second order dynamics (e.g. rise time, overshoot, settling time) of the by-wire actuation system 565.

At substantially the same time that reference system 560 is determining reference actuation output 561, MRAC feedback controller 555 receives desired input 521. Assuming that desired input action 521 was received by MRAC feedback controller 555 at a time to, MRAC feedback controller 555 will not yet have received adaptive gains 571 related to desired input action 521. Thus, at time to, MRAC feedback controller 555 may pass desired input action 521 to by-wire actuation system 565 as actuation command, u, 559, without adaptive gains 571. In practice, by-wire actuation system 565 is very often a third party component which is treated as a black box. Thus, by-wire actuation system 565 generates an actuation action, x, 566 in accordance with the programming or logic of actuation system 565 as produced by the manufacturer of by-wire actuation system 565. The by-wire actuation action 566 is sent to (1) a vehicle system, e.g. 575 as shown in FIG. 5A, (2) a summation circuit 562, (3) a summation circuit 567 and (4) MRAC feedback controller 555 as input for MRAC feedback controller 555 at time $t_1$.

The predictor system 580 predicts a future predicted action 581, e.g. a future steering action, and uses the predicted action 581 to generate a predicted control error 568 that generates a faster and more accurate control response. In addition to the control error 569 from the reference system 560, the predicted control error 568 provides additional information about the by-wire actuation system's uncertain parameters. This additional information helps to better maintain the closed-loop stability and tracking performance. The extended MRAC with the predictor system has more potential to improve the robustness and transient performance of the actuation control system 550.

Predictor system 580 sends its predicted actuation action 581 to comparator 562. Comparator 562 determines a predicted control error 568 as the difference between actuation action 566 and predicted actuation action 581. Reference system 560 sends its reference actuation action 561 to comparator 567. Comparator 567 determines a control error 569 as the difference between actuation action 566 and reference action 561. Predicted control error 568 and control error 569 are passed to MRAC adaptive gain system 570 to determine adaptive gains 571 to feed back to MRAC feedback controller 555 for a next iteration of the inner control loop of actuation control system 550 at a time $t_1$, and subsequent times $t_2 \ldots t_n$, until execution of the actuation command 521 is completed or a new actuation action 521 is received. After the first iteration, at time $t_0$ of the inner control loop, adaptive gains 571 and the last actuation action 566 are fed back to a time-delay compensation function, f(r, t, x), to introduce time-latency into the next reference actuation action 561 and to include the adaptive gains 571 into the next reference actuation action 561. The time-delay compensation function 579 gathers all of the time-latency related terms in the closed-loop mathematical model of the overall adaptive control system. A motivation for including the time-delay compensation in the design of the auxiliary ("reference") system 560 is to cancel these "time-latency" terms when calculating the difference between the actuation action 566 and the reference system action 561. By this design, the negative effect of the time-latency factors in the overall closed-loop system stability will be eliminated.

By-wire actuation action 566 includes real-world dynamic delays and time-latency. When the next control error 569 is determined, the real-world dynamic delay and time-latency in actuation 566 will be offset by the time-delay compensation introduced into the reference actuation action 561, thereby generating the control error 569 substantially without any dynamic delay or time-latency. Similarly, predicted action 581 will have time-latency introduced by time-latency module 556. When the next predicted error 568 is determined, the real-world dynamic delay and time-latency in actuation action 566 will be offset by the time-latency function 556, thereby generating the predicted error 568 substantially without any time-latency.

In an embodiment, adaptive gain 571 can be determined by MRAC adaptive gain system 570 as follows. A $1^{st}$ order system is discussed for simplification, which is sufficient for interpretation of the adaptive algorithm.

(1) Adaptive feedback law:

$u = \hat{k}_x x + \hat{k}_r r$ where $\dot{\hat{k}}_x = -\gamma_x x (p_{ref} e + p_{prd} \hat{e})$ $\dot{\hat{k}}_r = -\gamma_r r (p_{ref} e + p_{prd} \hat{e})$ $\gamma_x, \gamma_r, > 0$ are constant adaptive gains that determine the convergence rate of the adaptive process; $p_{ref}, p_{prd} > 0$ are positive-determined constants of the reference system error and predictor system error, with the purpose of improving the system stability.

(2) Reference system dynamic functions, with time-delay compensation function:

$\dot{x}_a = a_{ref} x_a + b_{ref} r + f(\tau, t, x)$ wherein $f(\tau, t, x) = b[\hat{k}_x (t-\tau) x(t-\tau) + \hat{k}_r (t-\tau) r(t-\tau) - \hat{k}_x x - \hat{k}_r r]$ where $a_{ref}, b_{ref}$ are the reference state constant gain and input constant gain, $\tau$ is the time latency.

(3) Predictor system dynamic functions:

$\dot{\hat{x}} = a_{ref} \hat{x} + b_{ref} r - a_{prd} \hat{e} + b[u(t-\Sigma) - \hat{k}_x x - \hat{k}_r r]$ where $a_{prd}$ is the predictor state constant gain.

(4) (Actual system—Reference system) dynamic functions:

$\dot{e} = a_{ref} e + b[x(\hat{k}_x - k_x^*) + r(\hat{k}_r - k_r^*)]$ where $e = x - x_a$ $k_x^*, k_r^*$ are the ideal adaptive gains (5) (Actual system—Predictor system) dynamic functions:

$\dot{\hat{e}} = a_{prd} \hat{e} + b[x(\hat{k}_x - k_x^*) + r(\hat{k}_r - k_r^*)]$ where $\hat{e} = x - \hat{x}$.

Figure 5C:
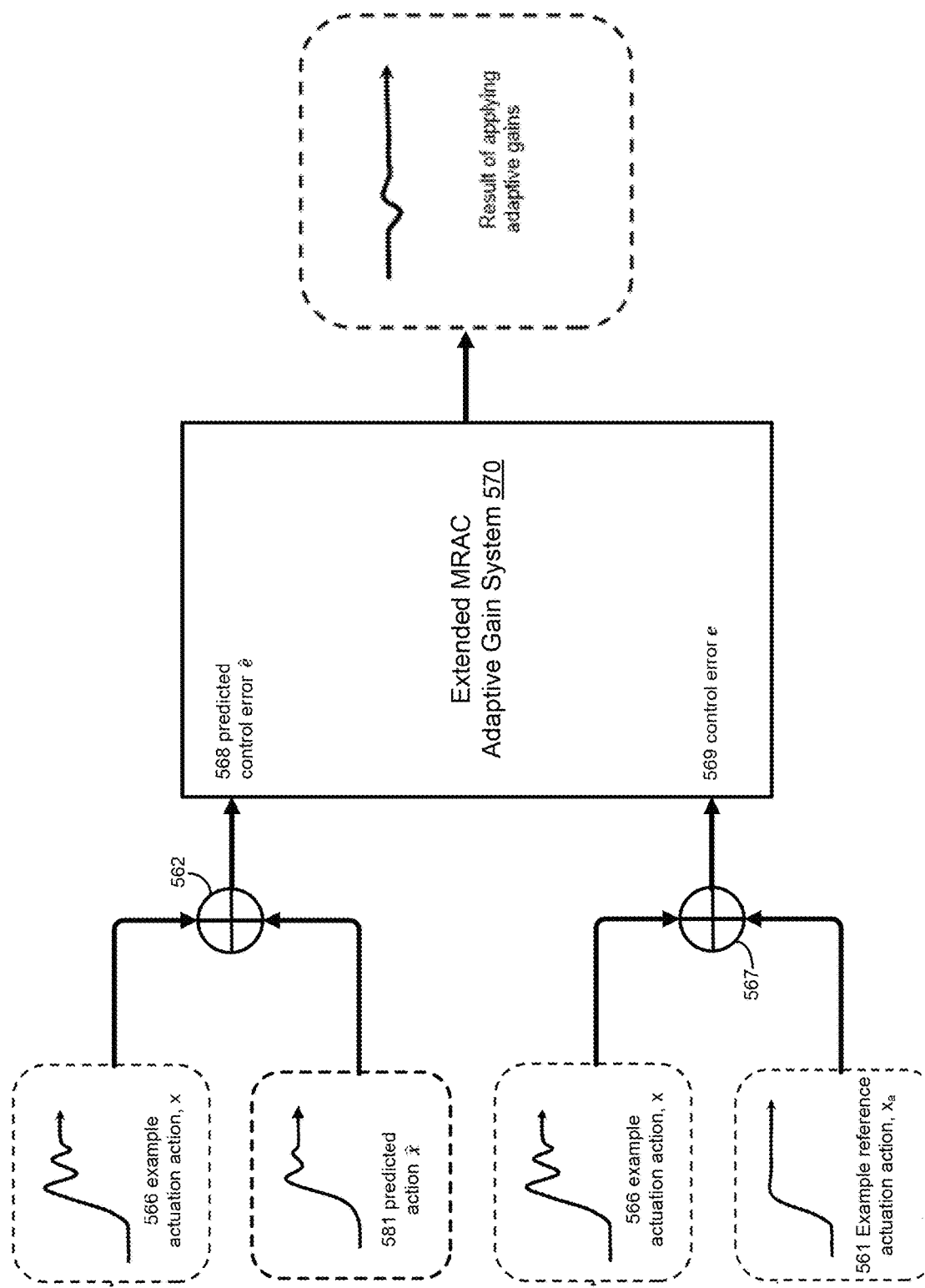
FIG. 5C is a block diagram illustrating subsystem control actuation, as modified by the model reference adaptive controller, according to one embodiment.

Referring now to FIG. 5C, further illustrating the details of FIGS. 5A and 5B, example reference actuation output 561 is summed with example actuation action 566 by summing circuit 567. The summed result is output as control error 569 to the extended MRAC feedback gain system 570. Example predicted actuation action 581 is summed with example actuation action 566 by summing circuit 562. The summed result is output as predicted error 568 to the MRAC adaptive gain system 570. MRAC adaptive gain system 570 generates adaptive gains 571 for use by MRAC feedback controller in a next iteration, $t_{n+1} = t_n + \Delta t$, wherein $\Delta t$ is a time increment. The time increment can be determined, or limited, by practical inner-loop iteration bandwidth. If a free-running inner loop iteration time is between 3-5 milliseconds (ms), inner loop iteration time may simply be to perform a next iteration upon completion of the last iteration. In an embodiment, the time increment of inner loop iteration may be fixed, e.g. 5 ms or 10 ms. The result of applying the adaptive gains 571 from extended MRAC adaptive gain system 570 to the by-wire actuation action 566 generates an actuation signal 559 with reduced error for the next iteration of the extended MRAC adaptive gain system 570 and MRAC feedback controller 555.

Figure 6:
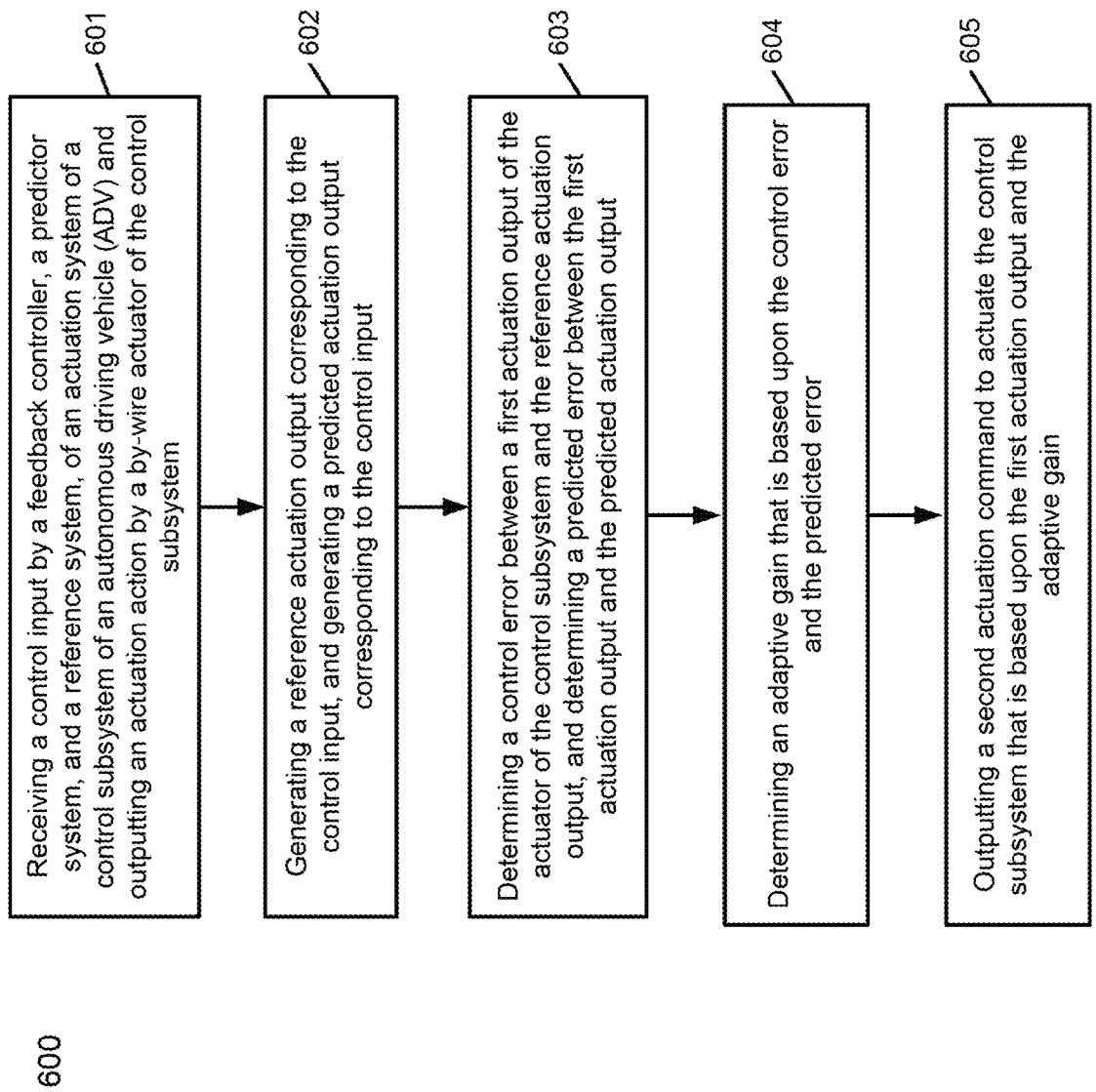
FIG. 6 is a block diagram illustrating a method of improving actuation of a control subsystem (e.g. throttle, braking, steering) using a model reference adaptive controller, according to one embodiment.

FIG. 6 is a block diagram illustrating a method 600 of improving actuation of a control subsystem (e.g. throttle, braking, steering) using a model reference adaptive controller 555 (MRAC), according to one embodiment.

In operation 601, a control input, e.g. desired input action 521, is received by a feedback controller 555, a predictor system 580, and a reference system 560 of an actuation system 550 of a control subsystem (e.g. throttle, brake, or steering) of an ADV. Responsive to the control input 521, the feedback controller 555 outputs an actuation command, e.g. 559, to the by-wire actuator 565 of the control subsystem, which in turn generates a first actuation output, e.g. actuation action 566.

In operation 602, a reference actuation output, e.g. 561, is generated by reference system 560, corresponding to the received control input 521. Reference actuation output 561 represents an "ideal" output that may, or may not, be achievable by the by-wire actuation system 565. The reference actuation output 561 is based, at least in part, on second order dynamic delays of the by-wire actuation system 565.

The second order delays are based upon historic driving data collected and analyzed to determine an ideal actuation output for the particular actuation subsystem, given the control input 521. A predicted actuation output, e.g. predicted action 581, is also generated corresponding to the received control input. The predicted actuation output 581, like the reference actuation output 561, is based at least in part upon historic driving data collected and analyzed to determine the predicted action for the particular actuation subsystem, given the control input. A difference between the reference ("ideal") actuation output and the predicted action 581 is that the predicted action represents how the by-wire system will respond given the control input 521 and the adaptive gains that may be applied in a next iteration of the inner loop of the actuation control system 550, whereas reference actuation output 561 represents the "ideal" by-wire actuation output that we are trying to achieve by way of the MRAC adaptive gains and MRAC feedback controller. In an embodiment, the reference actuation output 561 for the control subsystem corresponding to the received control input 521 can be looked up in a storage of subsystem controllers 205, in reference actuation outputs 206, or generated by an algorithm, generated using an artificial intelligence model, or a combination of these.

In operation 603, an error amount, e.g. control error 569, between a first actuation output of the actuator of the control subsystem, and the reference actuation output, can be determined. The error amount can be determined, e.g., by summing circuit 567 of actuation system 550 as described above with reference to FIG. 5A-5C. A predicted error amount, e.g. predicted error 568, between the first actuation action of the actuator of the control subsystem, and the predicted actuation output, can also be determined. The predicted error amount can be determined, e.g., by summing circuit 562 of actuation system 550 as described above with reference to FIGS. 5A-5C.

In operation 604, an adaptive gain amount can be determined, using the error amount and the predicted error amount. The adaptive gain can be applied to the first actuation output to obtain a second actuation command to the control subsystem that is based upon the reference actuation output and the adaptive gain.

In operation 605, the second actuation command to actuate the control subsystem that is based upon the first actuation output and the adaptive gain, is output to the control subsystem. Method 600 ends.

Figure 7A:
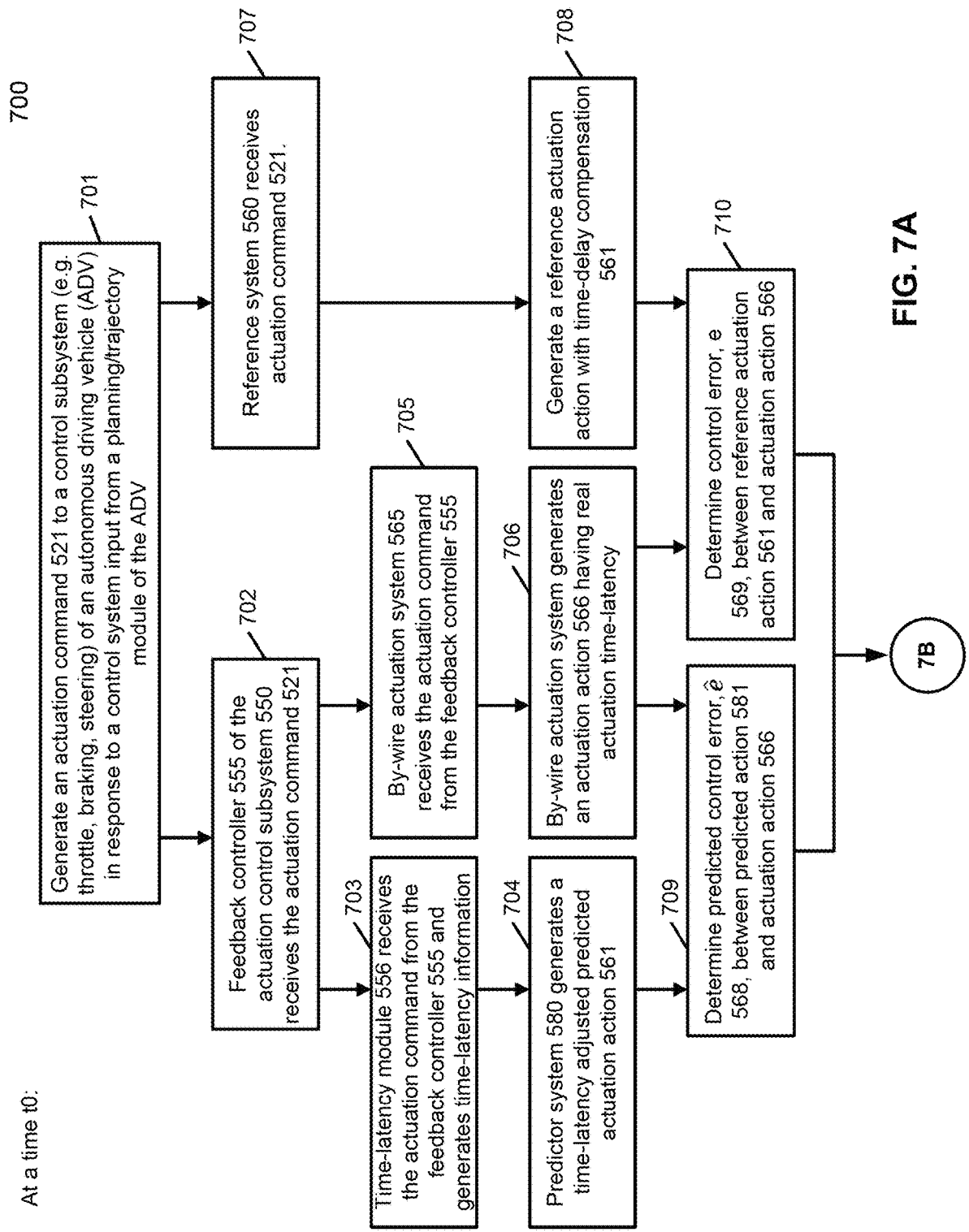
FIGS. 7A and 7B are block diagrams illustrating a method of improving actuation of a control subsystem (e.g. throttle, braking, steering) using a model reference adaptive controller, according to one embodiment.
Figure 7B:
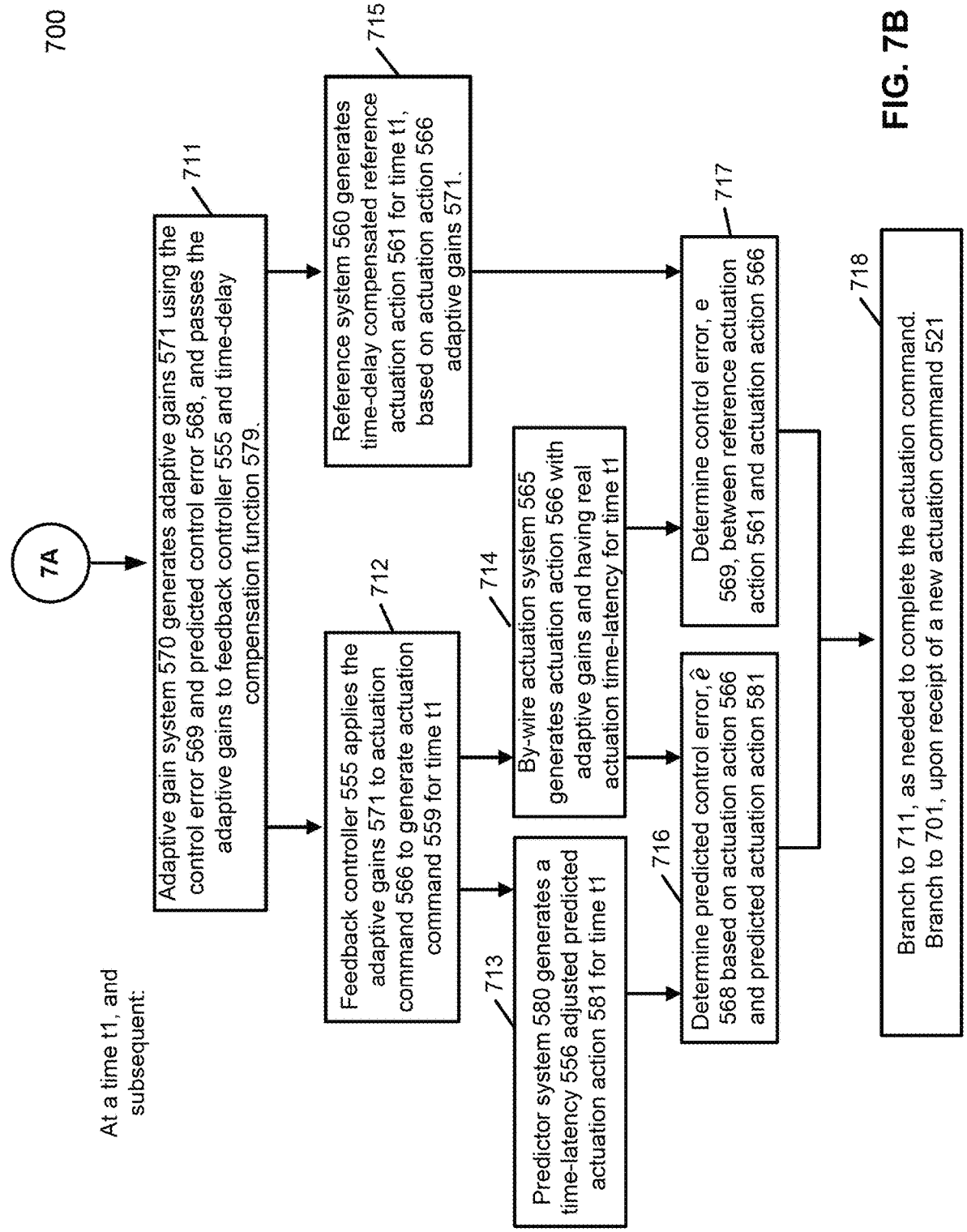

FIGS. 7A and 7B are block diagrams illustrating a method 700 of improving actuation of a control subsystem (e.g. throttle, braking, steering) using a model reference adaptive controller, according to one embodiment.

Referring now to FIG. 7A, in operation 701, at time $t_0$, a vehicle control system 505 generates an actuation command 521 to a control subsystem, such as a braking, throttle, or steering control subsystem, in response to receiving a control system input from a planning/trajectory module of an autonomous driving vehicle (ADV). Receipt, by vehicle control system 505, of planning/trajectory inputs 510 and generation of a corresponding actuation command 521 is an "outer loop" of control system 500. Method 700 continues at operations 702 and 707. In an embodiment, operations 702 and 707 can be performed in parallel. Time $t_0$ represents the start of a first loop iteration of the actuation control system 550 "inner loop," when the actuation control system 550 receives the control input 521 from vehicle control system 505. The inner loop continues until either the actuation command 521 has completed or a new (second, next, etc.) actuation command 521 is received from the outer loop, vehicle control system 505.

In operation 702, a feedback controller, e.g. 555, of the actuation control subsystem receives the actuation command 521 from the vehicle control system 505 for the actuation control subsystem 550 (e.g. steering, throttle, or braking). Method 700 continues at operations 703 and 705. In an embodiment, operations 703 and 705 can be performed in parallel.

In operation 703, a time latency module, e.g. 556, receives the actuation command 521 from the feedback controller 555 and generates time latency information for the actuation command 521. Method 700 continues at operation 704.

In operation 704, a predictor system, e.g. 580, generates a time-latency adjusted predicted actuation action 561. The predicted actuation action 561 is described above with reference to FIGS. 5A-5C. Method 700 continues at operation 709.

In operation 705, by-wire actuation system, e.g. 565, receives the actuation command 521 from the feedback controller 555. Method 700 continues at operation 706.

In operation 706, by-wire actuation system 565 generates an actuation action 566 having real actuation dynamic delays and actuation time latency. Method 700 continues at operations 709 and 710. In an embodiment, operations 709 and 710 can be performed in parallel.

In operation 707, reference system 560 receives the actuation command 521. Method 700 continues at operation 708.

In operation 708, reference system 560 generates a reference actuation action 561 having time-delay compensation. The time-delay compensation function 579 adds dynamic and time-latency delays to the desired ("ideal") reference actuation action 561. Method 700 continues at operation 710.

In operation 709, a predicted control error 568, e, can be determined between the predicted actuation action 581 output from predictor system 580 and the by-wire actuation action 566 output from the by-wire actuation system 565. Method 700 continues at FIG. 7B, operations 711.

In operation 710, a control error 569, e, can be determined between reference actuation action 561 and by-wire actuation action 566. Method 700 continues at FIG. 7B, operation 711.

Referring now to FIG. 7B, a method is described for inner loop iterations at times $t_1 \ldots t_n$ for executing the actuation command 521, which was received by actuation control system 550, from vehicle control system 505, at time to. Inner loop iterations continue until a next actuation action 521 is received or the actuation command 521 is implemented (e.g. ADV target speed reached, ADV stopped due to braking, ADV is slowed to a particular speed, etc.)

In operation 711, adaptive gain system 570 generates adaptive gains 571 based upon the predicted control error 568 and control error 569 determined in operations 709 and 710, respectively. The adaptive gains 571 are passed to MRAC feedback controller 555 and to time-delay compensation function 579. Actuation action 566, from the previous inner loop iteration, is also passed to MRAC feedback controller 555 and time-delay compensation function 579. Method 700 continues at operations 712 and 715. In an embodiment, operations 712 and 715 can be performed in parallel.

In operation 712, feedback controller 555 applies the adaptive gains 571 to the actuation command 566 to generate actuation command 559 for, e.g., time $t_1$. Actuation action 559 can be passed to time latency module 556 and to by-wire actuation system 565. Method 700 continues at operations 713 and 714. In an embodiment, operations 713 and 714 can be performed in parallel.

In operation 713, time latency module 556 receives actuation command 559 and generates time delay information for actuation command 559. Predictor system 580 receives the actuation command 559 and time latency information and generates a predicted actuation action 581 for, e.g., time $t_1$. Method 700 continues at operation 716.

In operation 714, by-wire actuation system 565 generates actuation action 566 with adaptive gains and real actuation dynamics and time-latency for, e.g., time increment $t_1$. Method 700 continues at operation 716.

In operation 715, reference system 560 generates a time-delay compensated reference actuation action 561 for, e.g., time $t_1$. The time-delay compensated reference actuation 561 is based on actuation action 566, adaptive gains 571 received and processed by time-delay compensation function 579, and one or more of an algorithm, an artificial intelligence model, or human-drawn ideal actuation curves. Method 700 continues at operation 717.

In operation 716, a summation circuit 562 determines a predicted control error, e, 568 that is the difference between actuation action 566, received from by-wire actuation system 565, and predicted actuation action 581, received from predictor system 580, for a time, e.g., $t_1$. Method 700 continues at operation 718.

In operation 717, a summation circuit 567 determines a control error, e, 569 that is the difference between actuation action 566, received from by-wire actuation system 565, and reference actuation action 561, received from the reference system 560, for a time, e.g., $t_1$. Method 700 continues at operation 718.

In operation 718, the method branches to operation 711 to complete execution of actuation command 521 with a next iteration of inner loop for a time $t_{next}=t_{last}+\Delta t$, e.g. $t_n=t_{n-1}+\Delta t$. If another, or next, actuation command 521 is received, then method 700 branches to operation 701 to perform the inner loop iteration for time $t_0$ for the newly received actuation command 521.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of improving performance of a control subsystem of an autonomous driving vehicle (ADV), the method comprising:
  receiving, by a feedback controller and a reference system, a control input of an actuation system of the control subsystem of the ADV;
  generating a predicted actuation output corresponding to the control input and a reference actuation output corresponding to the control input;
  determining a control error between a first actuation command output of an actuator of the control subsystem and the reference actuation output, and determining a predicted control error between the first actuation command output and the predicted actuation output;
  generating an adaptive gain that is based upon the control error and the predicted control error;

outputting a second actuation command to actuate the control subsystem, wherein the second actuation command is based upon the first actuation command output and the adaptive gain; and generating a second predicted actuation output based at least in part upon a temporary actuation output and time-latency information for the temporary actuation output.

2. The method of claim 1, wherein the reference actuation output is based at least in part on second order attributes of a dynamic model of the control subsystem.

3. The method of claim 2, wherein the second order attributes of the control subsystem include one or more of: time-latency in initiating a control action of the control subsystem, a rise time, an overshoot amount, or a settling time of an actuator of the control subsystem.

4. The method of claim 1, wherein the control subsystem of the ADV is one or more of a throttle control subsystem, a braking control subsystem, or a steering control subsystem.

5. The method of claim 1, wherein generating the predicted actuation output further includes:
generating time-latency information and the predicted actuation output is based at least in part on the generated time-latency information.

6. The method of claim 1,
wherein the temporary actuation output is generated by applying the adaptive gain to the first actuation command output.

7. The method of claim 6, further comprising generating a second reference actuation output, comprising:
applying a time-delay compensation function to the first actuation command output and the adaptive gain to generate a second temporary actuation output, and the second reference actuation output is based at least in part upon the second temporary actuation output.

8. The method of claim 7, further comprising:
determining a second predicted control error between a second actuation command output and the second predicted actuation output;
determining a second control error between the second actuation command output and the second predicted actuation output; and
generating second adaptive gains based upon the second control error and the second predicted control error.

9. A non-transitory machine-readable medium having instructions stored therein, which when executed by a processor, cause the processor to perform operations, the operations comprising:
receiving, by a feedback controller and a reference system, an actuation command of an actuation system of a control subsystem of an autonomous driving vehicle (ADV);
generating a predicted actuation output corresponding to the actuation command and a reference actuation output corresponding to the actuation command;
determining a control error between a first actuation command output of an actuator of the control subsystem and the reference actuation output, and determining a predicted control error between the first actuation command output and the predicted actuation output;
generating an adaptive gain that is based upon the control error and the predicted control error;
outputting a second actuation command to actuate the control subsystem, wherein the second actuation command is based upon the first actuation command output and the adaptive gain; and generating a second predicted actuation output based at least in part upon a temporary actuation output and time-latency information for the temporary actuation output.

10. The medium of claim 9, wherein the reference actuation output is based at least in part on second order attributes of a dynamic model of the control subsystem.

11. The medium of claim 10, wherein the second order attributes of the control subsystem include one or more of: time-latency in initiating a control action of the control subsystem, a rise time, an overshoot amount, or a settling time of an actuator of the control subsystem.

12. The medium of claim 9, wherein the control subsystem of the ADV is one or more of a throttle control subsystem, a braking control subsystem, or a steering control subsystem.

13. The medium of claim 9, wherein generating the predicted actuation output further includes:
generating time-latency information and the predicted actuation output is based at least in part on the generated time-latency information.

14. The medium of claim 9,
wherein the temporary actuation output is generated by applying the adaptive gain to the first actuation command output.

15. The medium of claim 14, the operations further comprising generating a second reference actuation output, comprising:
applying a time-delay compensation function to the first actuation command output and the adaptive gain to generate a second temporary actuation output, and the second reference actuation output is based at least in part upon the second temporary actuation output.

16. The medium of claim 15, the operations further comprising:
determining a second predicted control error between a second actuation command output and the second predicted actuation output;
determining a second control error between the second actuation command output and the second predicted actuation output; and
generating second adaptive gains based upon the second control error and the second predicted control error.

17. A data processing system, comprising:
a processor; and
a memory coupled to the processor to store instructions, which when executed by the processor, cause the processor to perform operations, the operations including:
receiving, by a feedback controller and a reference system, an actuation command of an actuation system of a control subsystem of an autonomous driving vehicle (ADV);
generating a predicted actuation output corresponding to the actuation command and a reference actuation output corresponding to the actuation command;
determining a control error between a first actuation command output of an actuator of the control subsystem and the reference actuation output, and determining a predicted control error between the first actuation command output and the predicted actuation output;
generating an adaptive gain that is based upon the control error and the predicted control error;
outputting a second actuation command to actuate the control subsystem, wherein the second actuation command is based upon the first actuation command output and the adaptive gain; and generating a second predicted actuation output based at least in part upon a temporary actuation output and time-latency information for the temporary actuation output.

18. The system of claim 17, wherein the control subsystem of the ADV is one or more of a throttle control subsystem, a braking control subsystem, or a steering control subsystem.

19. The system of claim 17, wherein generating the predicted actuation output further includes:

generating time-latency information and the predicted actuation output is based at least in part on the generated time-latency information.

20. The system of claim 17, wherein the temporary actuation output is generated by applying the adaptive gain to the first actuation command output.

21. The system of claim 20, the operations further comprising generating a second reference actuation output, comprising:

applying a time-delay compensation function to the first actuation command output and the adaptive gain to generate a second temporary actuation output, and the second reference actuation output is based at least in part upon the second temporary actuation output.

22. The system of claim 21, the operations further comprising:

determining a second predicted control error between a second actuation command output and the second predicted actuation output;

determining a second control error between the second actuation command output and the second predicted actuation output; and generating second adaptive gains based upon the second control error and the second predicted control error.

* * * * *